(12) United States Patent
Shimauchi et al.

(10) Patent No.: US 8,354,840 B2
(45) Date of Patent: Jan. 15, 2013

(54) MAGNETIC DETECTION DEVICE

(75) Inventors: Hideki Shimauchi, Chiyoda-ku (JP);
Hiroshi Kobayashi, Chiyoda-ku (JP);
Yuji Kawano, Chiyoda-ku (JP);
Yoshinori Tatenuma, Chiyoda-ku (JP)

(73) Assignee: Mitsubishi Electric Corporation,
Tokyo (JP)

( * ) Notice: Subject to any disclaimer, the term of this patent is extended or adjusted under 35 U.S.C. 154(b) by 385 days.

(21) Appl. No.: 12/774,786

(22) Filed: May 6, 2010

(65) Prior Publication Data

US 2011/0101965 A1 May 5, 2011

(30) Foreign Application Priority Data

Oct. 30, 2009 (JP) .................................. 2009-250404
Nov. 27, 2009 (JP) .................................. 2009-270142

(51) Int. Cl.
*G01B 7/30* (2006.01)
(52) U.S. Cl. .......... 324/207.25; 324/207.21; 324/207.22
(58) Field of Classification Search ............. 324/207.21, 324/207.22, 207.25
See application file for complete search history.

(56) References Cited

U.S. PATENT DOCUMENTS

| | | | | |
|---|---|---|---|---|
| 2002/0101233 A1* | 8/2002 | Yokotani et al. | ......... | 324/207.21 |
| 2007/0114991 A1* | 5/2007 | Tatenuma et al. | ........ | 324/207.25 |
| 2007/0170913 A1* | 7/2007 | Yokotani et al. | ......... | 324/207.22 |

FOREIGN PATENT DOCUMENTS

| | | |
|---|---|---|
| JP | 57-14858 U | 1/1982 |
| JP | 2001-088632 A | 4/2001 |

* cited by examiner

*Primary Examiner* — Patrick Assouad
*Assistant Examiner* — Son Le
(74) *Attorney, Agent, or Firm* — Sughrue Mion, PLLC

(57) ABSTRACT

A magnetic detection device includes a signal processing circuit that detects a moving position and a moving direction of a magnetic mobile object using an output of a comparing circuit configured to output a signal by comparing an output signal of a magneto-electric transducer element with a threshold. A duration during which an output of the signal processing circuit is in a high level or in a low level is fixed to a period t1 or a period t2 depending on the moving direction of the magnetic mobile object. When switching of the moving direction of the magnetic mobile object takes place within the period t1 or the period t2, the signal processing circuit outputs a position signal same as a position signal indicating a position immediately before the switching of the moving direction of the magnetic mobile object due to hysteresis of the threshold of the comparing circuit.

8 Claims, 17 Drawing Sheets

MAGNETIC DETECTION DEVICE

BACKGROUND OF THE INVENTION

1. Field of the Invention

The present invention relates to a magnetic detection device that detects field intensity induced by a magnetic mobile object, for example, a magnetic detection device that detects a revolution or a rotation angle of a rotating body, and more particularly, to a magnetic detection device capable of detecting a moving direction of a magnetic mobile object.

2. Background Art

Regarding a magnetic detection device that detects field intensity induced by a magnetic mobile object, there have been several techniques for a method of detecting a moving direction of a magnetic mobile object depending on a signal outputted from a magnetic detection sensor. In a case where a sensor output signal is a digital signal (rectangular wave), a method of applying voltage modulation to a sensor output signal and a method of applying time modulation to a sensor output signal are available for detection of a moving direction of a magnetic mobile object.

One of techniques in the related art for applying voltage modulation to a sensor output signal is disclosed in Japanese Patent No. 3588044. According to this method, a magnetic detection sensor accommodates a magnet that generates a bias magnetic field, first and second magneto-resistance effect elements disposed oppositely to the magnetic mobile object and side by side in a moving direction thereof, and output circuits for the respective magneto-resistance effect elements. The magnetic detection sensor detects a change in magnetic field in response to a movement of the magnetic mobile object and sets at least either a high level or a low level of the output signal to different potential depending on the moving direction. Accordingly, a computer unit detects the moving direction by measuring the potential of the sensor output signal.

Meanwhile, according to the method of applying time modulation to a sensor output signal, output timing (time) of a magnetic detection sensor varies with a moving direction of the magnetic mobile object. For example, when the moving direction is the forward direction, a duration of the signal is set to a and when the moving direction is the inverse direction, a duration of the signal is set to b(≠a). Accordingly, a computer unit detects a moving direction by measuring the duration of the sensor output signal.

The present invention relates to a method of applying time modulation to a sensor output signal and techniques for this method in the related art are disclosed, for example, in JP-UM-A-57-14858 and JP-A-2001-88632.

A magnetic detection device in the related art will be described first with reference to FIG. 15 through FIG. 18B.

FIG. 18A and FIG. 18B are views showing the configuration of a magnetic circuit in the magnetic detection device in the related art. FIG. 18A is a perspective view and FIG. 18B is a front view. Referring to FIG. 18A and FIG. 18B, a magnet 3 generating a bias magnetic field is disposed on the bottom surface of a signal processing circuit chip 2 formed monolithically with magneto-electric transducer elements 1a and 1b. This assembly is oppositely moved closer to a magnetic mobile object 4, so that the magneto-electric transducer elements 1a and 1b detect a magnetic field distribution developed by the magnetic field generated by the magnet 3 with an increasing proximity and movements of the magnetic mobile object 4 and output the detected magnetic field distribution as electric resistance and a change thereof. In order to detect a moving direction of the magnetic mobile object 4, it is necessary for the magneto-electric transducer elements 1a and 1b to cause a change in electric resistance with a time delay, that is, a phase difference, in association with the movements. To this end, for example, the magneto-electric transducer elements 1a and 1b are disposed side by side in the moving direction of the magnetic mobile object 4.

FIG. 15 shows a signal processing circuit of the magnetic detection device. The magneto-electric transducer elements 1a and 1b form bridge circuits 10a and 10b, respectively. When electric resistances of the magneto-electric transducer elements 1a and 1b change in response to a movement of the magnetic mobile object 4, bridge signals a and b are obtained as voltage changes. The bridge signals a and b are compared with thresholds c and d in comparing circuits 11 and 12, respectively, and converted to rectangular wave signals e and f, respectively. The rectangular wave signals e and f are inputted into a moving direction determination circuit 13 and a moving direction signal g is obtained. The moving direction signal g together with the rectangular wave signal f is inputted into an output signal generation circuit 14 and processed therein. A sensor output signal i is thus obtained as an output.

FIG. 16 shows operation waveforms of the magnetic detection device. In the drawing, small letters a and b represent bridge signals of the magneto-electric transducer elements 1a and 1b, respectively, small letters c and d represent thresholds of the respective bridge signals, and small letters e, f, g, and i represent signals of respective portions in the signal processing circuit. The waveforms show an example where the moving direction of the magnetic mobile object switches from the forward direction to the inverse direction. There is a phase difference between the rectangular wave signals e and f converted from the bridge signals a and b, respectively, and a combination thereof varies with the moving direction of the magnetic mobile object. The moving direction signal g is in a low level and a high level when the moving direction of the magnetic mobile body is a forward direction and an inverse direction, respectively. Time modulation is applied to switching timing from the high level to the low level, which is a position signal of the sensor output signal i, in sync with the rectangular wave signal f depending on the moving direction of the magnetic mobile object in such a manner that a time of the low level becomes a period t1 and a period t2 when the moving direction is the forward direction and the inverse direction, respectively.

FIG. 17 shows the bridge signal b of the magneto-electric conversion element 1b and the threshold d thereof, the signals e, f, and g of the respective portions in the signal processing circuit, and the sensor output signal i (the bridge signal a and the threshold c are omitted). The waveforms show an example where the moving direction of the magnetic mobile object switches from the inverse direction to the forward direction.

When the magnetic mobile object moves, the bridge signal b varies in response to protrusions (1) and (2) of the magnetic mobile object. The bridge signal b thus crosses the threshold d at a time A and the rectangular wave signal f switches from the low level to the high level whereas the sensor output signal switches from the high level to the low level.

Thereafter, the sensor output signal i returns to the high level at a time C after an elapse of the period t2.

At a time B at which the sensor output signal i is in the low level, the bridge signal b crosses the threshold d again. The rectangular wave signal f thus switches from the high level to the low level. Being within the period t2, the sensor output signal i cannot output the position signal in sync with the signal f of the signal processing circuit.

The computer unit determines the moving direction by measuring a duration of the low level of the sensor output signal i. The position of the magnetic mobile object is detected from the switching of the sensor output signal i at the time A from the high level to the low level. Because the duration of the low level of the sensor output signal i at the time C is the period t2, it is determined that the moving direction of the magnetic mobile object is the inverse direction and the position thereof is the protrusion (1). Thereafter, switching of the sensor output signal i again from the high level to the low level is detected at a time D. Because the duration of the low level of the sensor output signal i at a time E is the period t1, it is determined that the moving direction of the magnetic mobile object is the forward direction and the position thereof is the protrusion (1) from the sensor output signal i at the time D. Hence, the protrusion (1) after the switching of the moving direction of the magnetic mobile object is detected with a delay.

The detection delay may possibly be accumulated during repetitive operations in the forward direction and the inverse direction of the moving direction. Hence, the magnetic detection device in the related art is not suitably used when it is necessary to detect the moving position exactly by detecting the moving direction.

SUMMARY OF THE INVENTION

The invention was devised to solve the problems with the device in the related art as discussed above and has an object to provide a magnetic detection device capable of detecting the moving direction of the magnetic mobile object exactly without any delay even in a case where the switching of the moving direction of the magnetic mobile object takes place within the period of a duration t1 or t2 of the high level or the low level of the sensor output signal.

A magnetic detection device according to an aspect of the invention includes a signal processing circuit having magneto-electric transducer elements that detect field intensity, comparing circuits that have thresholds and output rectangular wave signals by comparing the thresholds with output signals of the magneto-electric transducer elements, and signal processing portions that output a sensor output signal by detecting a moving position and a moving direction of a magnetic mobile object that gives a change to a magnetic field to be applied to the magneto-electric transducer elements using the output signals of the comparing circuits. An output of the signal processing circuit is a position signal undergoing one of switching from a high level to a low level and switching from the low level to the high level and the switching corresponds to a position of the magnetic mobile object. A duration during which the position signal is in one of the high level and the low level corresponds to the moving direction, of the magnetic mobile object. The duration during which the position signal is in one of the high level and the low level is fixed to one of a period t1 and a period t2 depending on the moving direction of the magnetic mobile object. In a case where the switching of the moving direction of the magnetic mobile object takes place within a time of one of the period t1 and the period t2, the signal processing circuit outputs a position signal same as a position signal indicating the position of the magnetic mobile object immediately before the switching of the moving direction of the magnetic mobile object due to hysteresis of the threshold of the comparing circuit, so that no displacement occurs between the position of the magnetic mobile object and the position signal of the signal processing circuit caused by the switching of the moving direction of the magnetic mobile object.

According to the magnetic detection device configured as above, even in a case where the switching of the moving direction of the magnetic mobile object takes place within the period of the duration t1 or t2 during which the sensor output signal is in the high level or in the low level, the moving direction of the magnetic mobile object can be detected exactly without any delay. The computer unit thus becomes able to detect the position of the magnetic mobile body exactly.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

First Embodiment

Figure 1A:
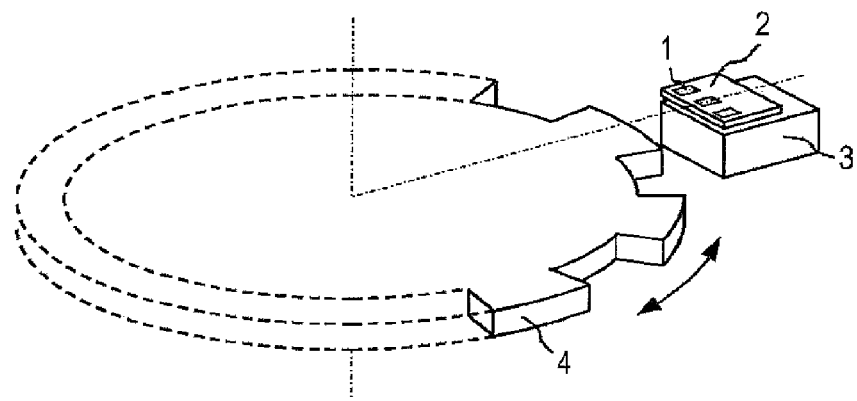
FIG. 1A and FIG. 1B are views showing the configuration of a magnetic circuit in a magnetic detection device according to a first embodiment of the invention.
Figure 1B:
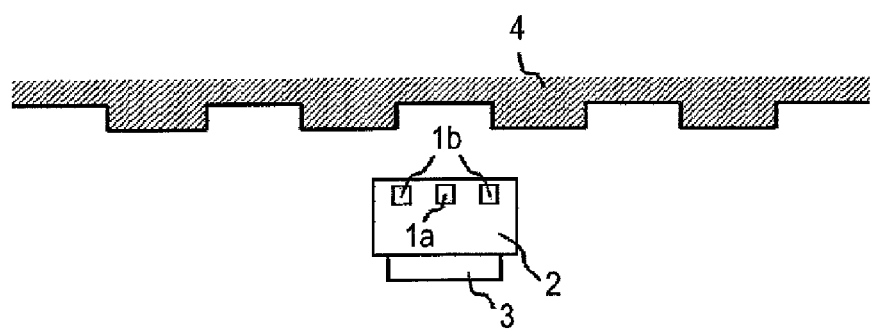

FIG. 1A and FIG. 1B are views showing the configuration of a magnetic circuit in a magnetic detection device according to a first embodiment of the invention. FIG. 1A is a perspective view and FIG. 1B is a front view.

As are shown in FIG. 1A and FIG. 1B, the magnetic detection device of the first embodiment has a magnet 3 generating a bias magnetic field and disposed on the bottom surface of a signal processing circuit chip 2 formed monolithically with magneto-electric transducer elements 1a and 1b. This assembly is oppositely moved closer to a magnetic mobile object 4, so that the magneto-electric transducer elements 1a and 1b detect a magnetic field distribution developed by the magnetic field generated by the magnet 3 with an increasing proximity and movements of the magnetic mobile object 4 and output the detected magnetic field distribution as electric resistance and a change thereof. In order to detect a moving direction of the magnetic mobile object 4, it is necessary for the magneto-electric transducer elements 1a and 1b to cause a change in electric resistance with a time delay, that is, a phase difference, in association with the movements. To this end, for example, the magneto-electric transducer elements 1a and 1b are disposed side by side in the moving direction of the magnetic mobile object 4.

Figure 2:
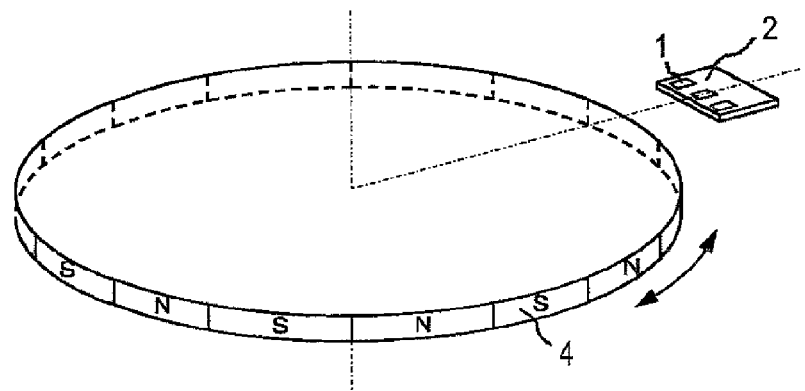
FIG. 2 is a view showing another example of the configuration of the magnetic circuit according to the first embodiment of the invention.

It is sufficient to form the magnetic circuit in the magnetic detection device of the invention in such a manner that the magneto-electric transducer elements 1a and 1b are able to detect the magnetic field distribution developed by an increasing proximity and movements of the magnetic mobile object 4. For example, as is shown in FIG. 2, the magnetic mobile object 4 may be a collective entity of magnets disposed at certain pitches. In this case, the magnet 3 may be omitted.

Figure 3:
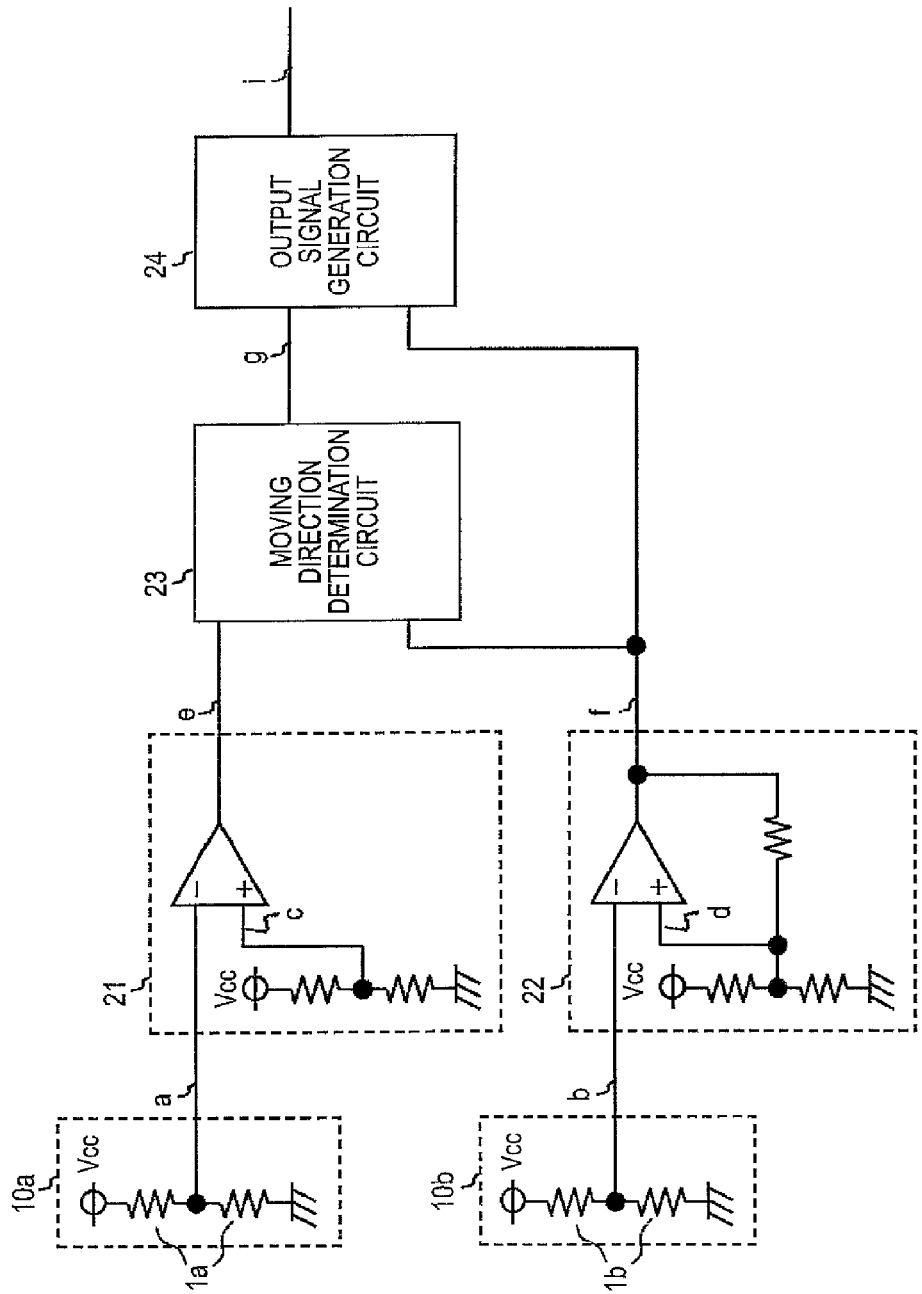
FIG. 3 is a view showing a signal processing circuit in the magnetic detection device according to the first embodiment of the invention.

FIG. 3 shows a signal processing circuit in the magnetic detection device of the first embodiment.

As is shown in FIG. 3, the magneto-electric transducer elements 1a and 1b form bridge circuit 10a and 10b, respectively, and when electric resistances of the magneto-electric transducer elements 1a and 1b vary in response to a movement of the magnetic mobile object 4, bridge signals a and b are obtained as voltage changes. The bridge signals a and b are compared with thresholds c and d in comparing circuits 21 and 22, respectively, and converted to rectangular wave signals e and f, respectively. The rectangular wave signals e and f are inputted into a moving direction determination circuit 23 serving as a signal processing portion and a moving direction signal g is obtained. The moving direction signal g together with the rectangular wave signal f is inputted into an output signal generation circuit 24 also serving as a signal processing portion and processed therein. A sensor output signal i is thus outputted as an output.

Figure 4:
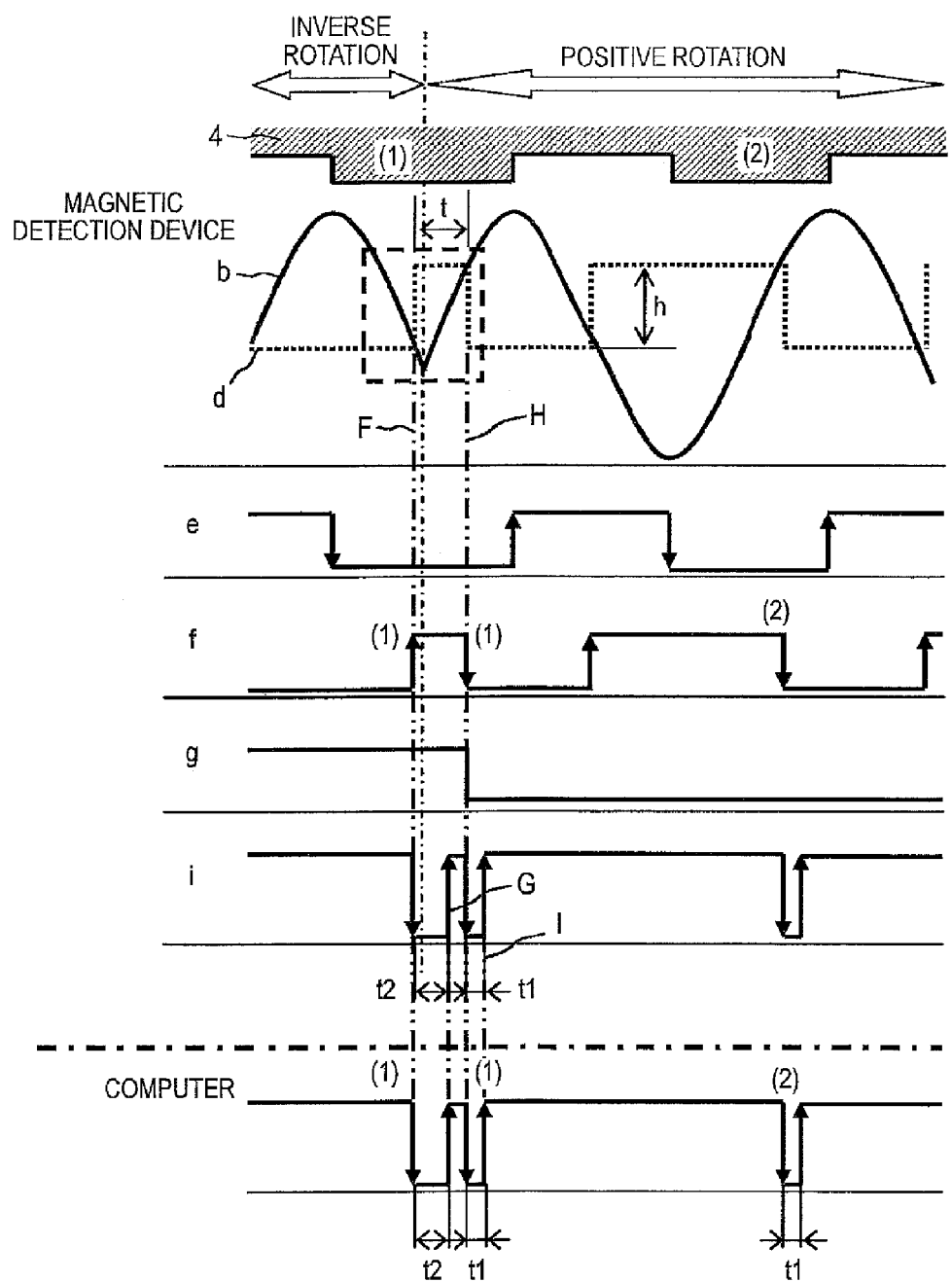
FIG. 4 is an operation waveform chart of the magnetic detection device according to the first embodiment of the invention.

FIG. 4 is an operation waveform chart of the first embodiment. Respective waveforms in the chart represent the bridge signal b and the threshold d of the comparing circuit 22, the signals e, f, and g of the respective portions in the signal processing circuit, and the sensor output signal i (the bridge signal a and the threshold c are omitted). The waveforms show an example where the moving direction of the magnetic mobile object 4 switches from the inverse direction to the forward direction.

As will be described below, the threshold d has hysteresis h. Also, there is a phase difference between the rectangular wave signals e and f converted from the bridge signals a and b, respectively. Because a combination thereof varies with the moving direction of the magnetic mobile object 4, it is possible to determine the moving direction of the magnetic mobile object 4. The moving direction signal g is in a low level and in a high level when the moving direction is in the forward direction and the inverse direction, respectively.

Time modulation is applied to the sensor output signal in sync with the rectangular wave signal f depending on the moving direction in such a manner that a time of the low level becomes a period, t1=45 μsec, and a period, t2=90 μsec, when the moving direction is the forward direction and the inverse direction, respectively.

Figure 5:
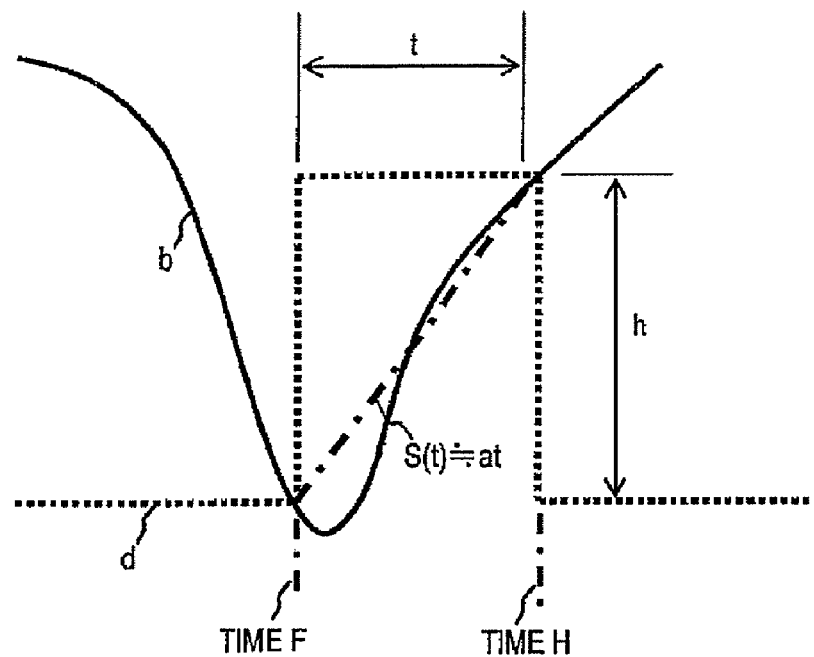
FIG. 5 is an enlarged view in the vicinity of the intersection of a bridge signal b and a threshold d in FIG. 4.

FIG. 5 is an enlarged view in the vicinity of the intersection of the bridge signal b and the threshold d in FIG. 4.

When the bridge signal b crosses the threshold d (time F), the rectangular wave signal f switches from the low level to the high level. At the same time, the threshold d varies only by the hysteresis h. When the threshold d varies only by the hysteresis h, a delay of a time t occurs since the time F at which the bridge signal b crosses the threshold d until the bridge signal b crosses the threshold d next (time H).

In a case where a variance $S(t)$ of the bridge signal b after the switching of the moving direction of the magnetic mobile object at the time F can be approximated to $a \times t$, where a is a constant, the hysteresis h of the threshold d in FIG. 4 is set to a value such that satisfies an inequality:

$$h^2 > t2^2 \times (a^2-1).$$

Hence, the rectangular wave signal f switches from the high level to the low level with a delay from the period t2 during which the sensor output signal i is in the low level. Accordingly, because the timing (position signal) at which the sensor output signal i indicating the position of the magnetic mobile object 4 switches from the high level to the low level can be outputted in sync with the rectangular wave signal f, no detection delay occurs when the moving direction of the magnetic mobile object is detected. The computer unit thus becomes able to detect the position of the magnetic mobile object exactly even in a case where the switching of the moving direction of the magnetic mobile object takes place within the period t2.

Figure 6:
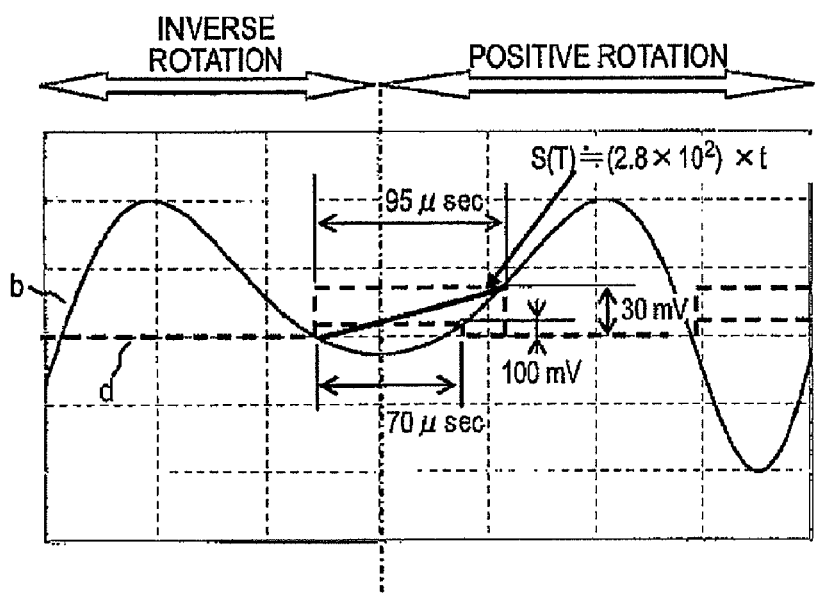
FIG. 6 is a view showing a concrete example of operation waveforms of the bridge signal b and the threshold d in the magnetic detection device according to the first embodiment of the invention.

FIG. 6 shows, by way of example, the bridge signal b and the threshold d in the case of a rotation detection device of a circular plate attached to a crankshaft to detect the piston position of an engine in an automobile. The magnetic mobile object used herein is a plate made of iron having a diameter of 150 mm, a thickness of 2.6 mm, and 60 protrusions each having a protrusion width of 2.5 mm.

Given that $a=2.8 \times 10^2$ is a variance of the bridge signal b after the switching of the moving direction of the magnetic mobile object, $S(t)$ is approximated to $(2.8 \times 10^3) \times t$ and the value of the hysteresis h is set to 30 mV. Accordingly, an inequality:

$$h^2 > t2^2 \times (a^2-1)$$

is satisfied in FIG. 4. The rectangular wave signal f therefore switches from the high level to the low level after a delay of 95 μsec from the period, t2=90 μsec, during which the sensor output signal i is in the low level. The timing (position signal)

at which the sensor output signal i indicating the position of the magnetic mobile object switches from the high level to the low level can be therefore outputted in sync with the rectangular wave signal f. Accordingly, no detection delay occurs when the moving direction of the magnetic mobile object is detected.

The computer unit detects the position of the magnetic mobile object from the switching of the sensor output i from the high level to the low level at the time F. Because the duration of the low level of the sensor output signal i at a time G is the period t2, it is determined that the moving direction of the magnetic mobile object is the inverse direction and the position of the magnetic mobile object is the protrusion (1). Thereafter, the computer unit detects the switching of the output signal i again from the high level to the low level at a time H. Because the duration of the low level of the sensor output signal i at a time I is the period t1, it is possible to determine that the moving direction of the magnetic mobile object is the forward direction and the position is the protrusion (1) from the sensor output signal at the time H. It thus becomes possible to detect the position of the magnetic mobile object 4 exactly even in a case where the switching of the moving direction of the magnetic mobile object takes place within the period t1 or the period t2 during which the sensor output signal i indicating the moving direction of the magnetic mobile object 4 is in the low level.

In the first embodiment, detection of the moving direction of the magnetic mobile object is not limited to a case where the magnetic mobile object 4 is switched from the inverse direction to the forward direction and the magnetic mobile object may be switched from the forward direction to the inverse direction.

Figure 19:
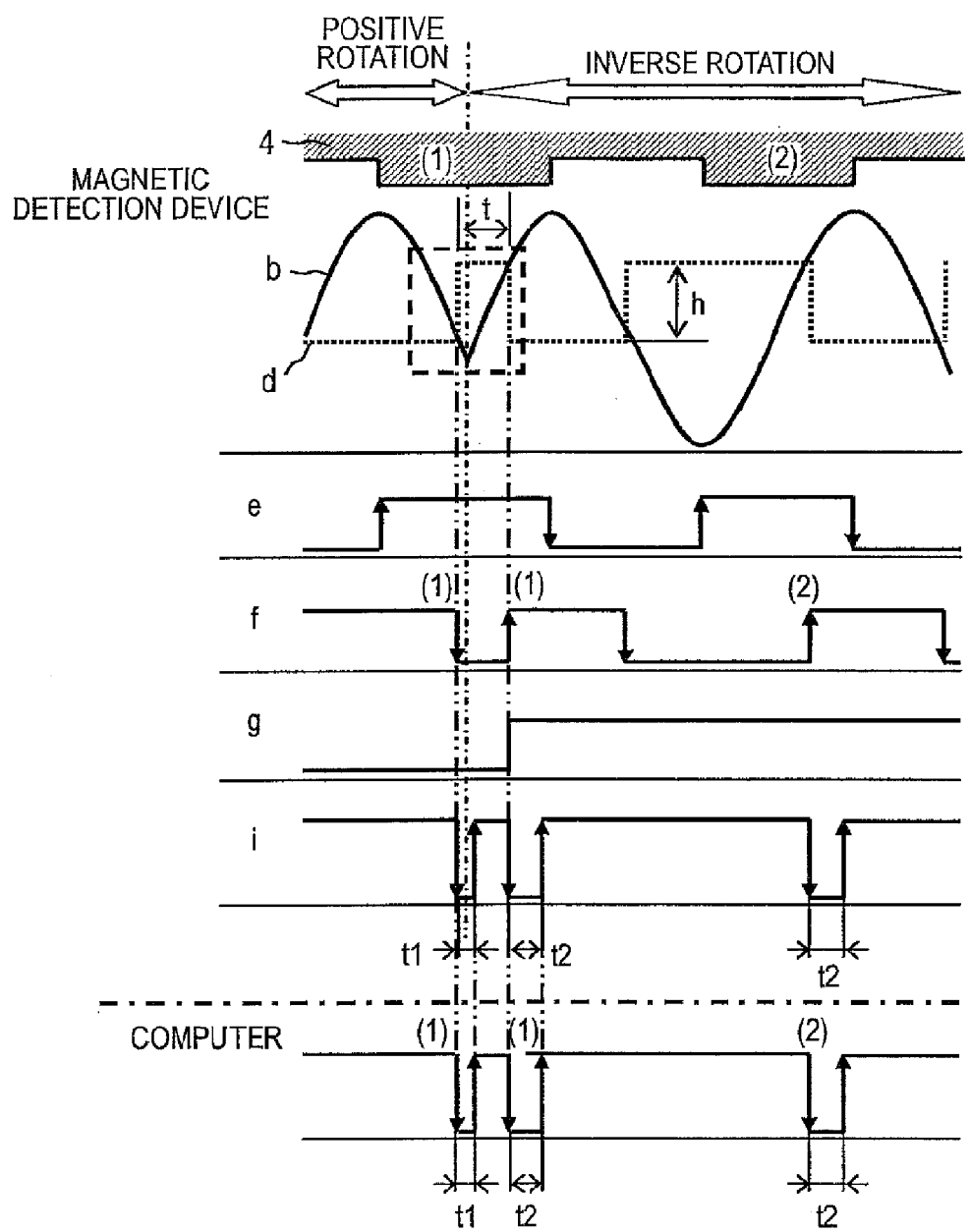
FIG. 19 is an operation waveform chart in a case where a magnetic mobile object is switched from the forward direction to the inverse direction in the magnetic detection device according to the first embodiment of the invention.

FIG. 19 is an operation waveform chart in a case where the magnetic mobile object is switched from the forward direction to the inverse direction.

Respective waveforms in the chart represent the bridge signal b and the threshold d, the signals e, f, and g of the respective portions in the signal processing circuit, and the sensor output signal i (the bridge signal a and the threshold c are omitted). The waveforms show an example where the moving direction of the magnetic mobile object switches from the forward direction to the inverse direction. Herein, in a case where the variance S(t) of the bridge signal b after the switching of the moving direction of the magnetic mobile object can be approximated to a×t, where a is a constant, a time delay t caused by the hysteresis is set so as to satisfy an inequality:

$$h^2 > t1^2 \times (a^2 - 1).$$

Hence, because the sensor output signal i can be outputted in sync with the rectangular wave signal f, no detection delay occurs when the moving direction of the magnetic mobile object is detected.

In a case where the magnetic detection device of the first embodiment described as above is used, for example, as a detection device that detects a rotation angle of a plate attached to the crankshaft of an engine, because the plate attached to the crankshaft is provided with protrusions in a regular manner, the bridge signal b shapes a waveform close to a sine wave. In this instance, because an inclination of the amplitude center of the bridge signal b becomes the largest, displacement between the protrusion position of the plate and the position signal of the sensor output signal becomes smaller by setting the threshold d at the amplitude center of the bridge signal b.

Setting hysteresis as in the first embodiment above is suitable for use particularly in a detection device that detects the rotation angle of the crankshaft of the engine incorporating an idling stop system with which displacement (position accuracy) of an output signal of the magnetic detection sensor with respect to the position of the magnetic mobile object can be less accurate when the moving direction of the magnetic mobile object is the inverse direction than when the moving direction of the magnetic mobile object is the forward direction.

It should be noted, however, that by setting the hysteresis h in the first embodiment in FIG. 6 to 10 mV, which is sufficiently larger than the noise width of the bridge signal b, a time delay caused by the hysteresis h is found to be 70 μsec. The sensor output signal i therefore cannot output the position signal in sync with the rectangular wave signal f. Hence, there is a possibility that a detection delay occurs when the moving direction of the magnetic mobile object is detected.

Second Embodiment

Figure 7:
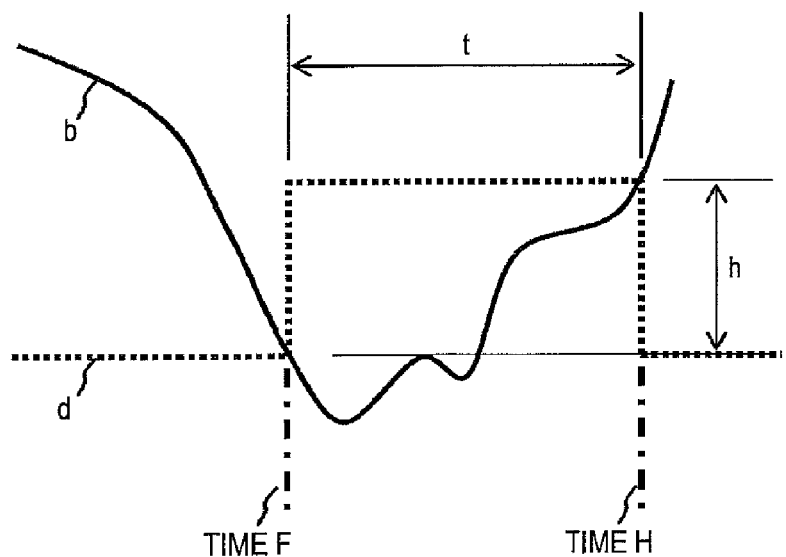
FIG. 7 is an enlarged view of the operation waveform showing a relation of a bridge signal b and a threshold d in a magnetic detection device according to a second embodiment of the invention.

FIG. 7 is an enlarged view of an operation waveform of a magnetic detection device according to a second embodiment of the present invention.

Because the configuration and the operation waveform chart of the signal processing circuit in the magnetic detection device of the second embodiment are the same as those described in the first embodiment above with reference to FIG. 3 and FIG. 4, descriptions are omitted herein.

FIG. 7 is an enlarged view in the vicinity of the intersection of the bridge signal b and the threshold d in FIG. 4.

When the bridge signal b crosses the threshold d (time F), the rectangular wave signal f switches from the low level to the high level and the threshold d varies only by the hysteresis h at the same time. When the threshold d varies only by the hysteresis h, a delay of a time t occurs since the time F at which the bridge signal b crosses the threshold d until the bridge signal b crosses the threshold d next (time H).

Herein, in the magnetic detection device of the second embodiment, the hysteresis h of the threshold d (FIG. 4) is set to a value such that satisfies an inequality:

$$t > t2.$$

Accordingly, the rectangular wave signal f switches from the high level to the low level with a delay from the period t2 during which the sensor output signal i is in the low level. Hence, as with the first embodiment above, because the sensor output signal i in FIG. 4 can be outputted in sync with the rectangular wave signal f, no detection delay occurs when the moving direction of the magnetic mobile object is detected. The computer unit thus becomes able to detect the position of the magnetic mobile object exactly even in a case where the switching of the moving direction of the magnetic mobile object takes place.

Also, in order not to cause a detection delay of the moving direction of the magnetic mobile object even in a case where the moving direction of the magnetic mobile object switches from the forward direction to the inverse direction, it is sufficient to set a delay time t caused by the hysteresis h of the threshold d to satisfy an inequality below for the period t1 or the period t2 during which the sensor output signal i is in the low level:

$$t > t1 \text{ (where } t1 > t2\text{)}$$

or $$t > t2 \text{ (where } t1 < t2\text{)}.$$

When set in this manner, the rectangular wave signal f switches from the high level to the low level with a delay from the period t1 or the period t2 during which the sensor output signal i is in the low level. Because the timing (position signal) at which the sensor output signal i indicating the position of the magnetic mobile object switches from the high level to the low level can be outputted in sync with the rectangular wave signal f, no detection delay occurs when the moving direction of the magnetic mobile object is detected.

Third Embodiment

Figure 8:
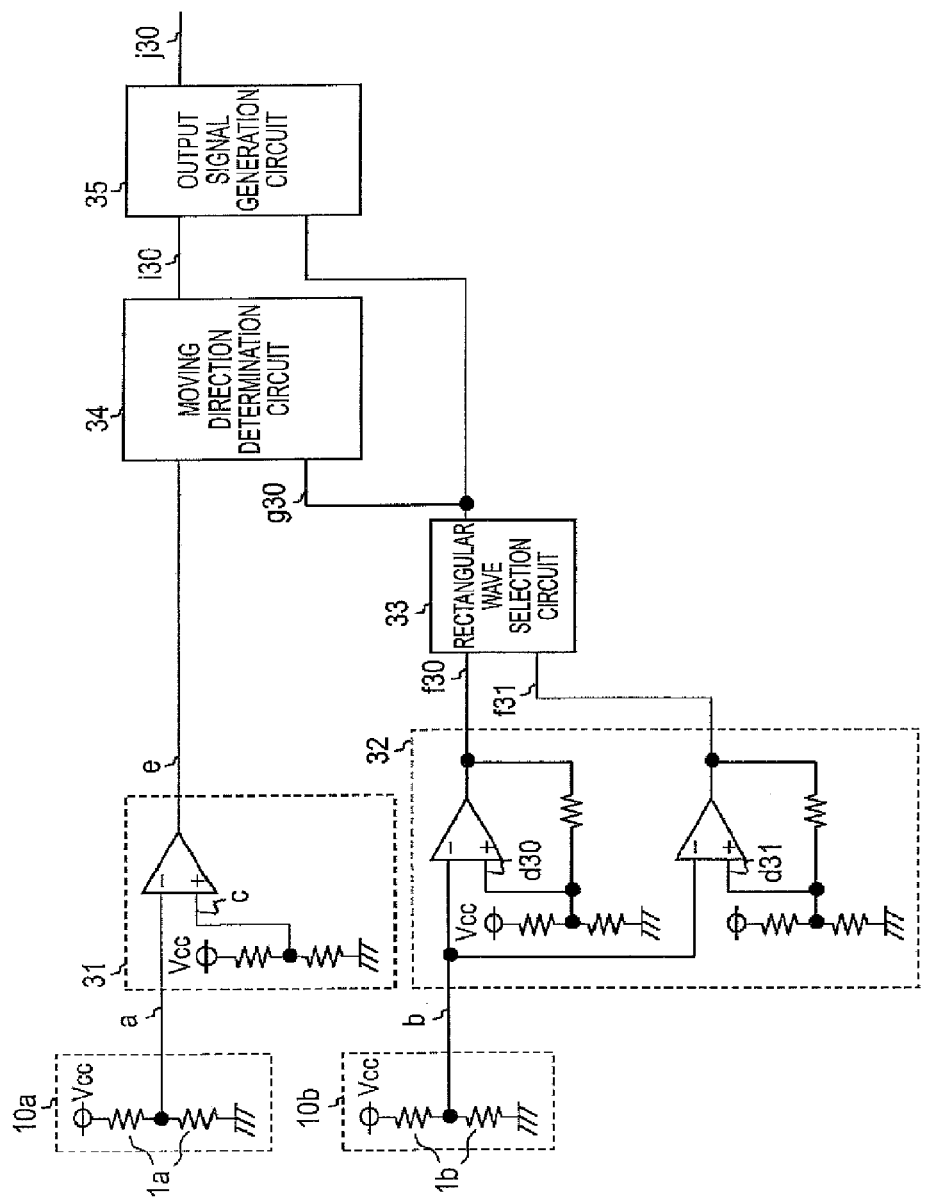
FIG. 8 is a view showing a signal processing circuit in a magnetic detection device according to a third embodiment of the invention.

FIG. 8 shows a signal processing circuit in a magnetic detection device according to a third embodiment of the invention. Referring to FIG. 8, magneto-electric transducer elements 1a and 1b form bridge circuits 10a and 10b, respectively, and when electric resistances of the magneto-optical conversion elements 1a and 1b vary in response to a movement of the magnetic mobile object 4, bridge signals a and b are obtained as voltage changes. The bridge signal a is compared with a threshold c in a comparing circuit 31 and converted to a rectangular wave signal e. The bridge signal b is compared with thresholds d30 and d31 having different hystereses h30 and h31 (h30<h31), respectively, in a comparing circuit 32 and converted to rectangular wave signals f30 and f31, respectively.

A difference between the rectangular wave signals f30 and f31 converted from the bridge signal b is delay times t30 and t31 caused by hystereses of the switching from the high level to the low level. The rectangular wave signals f30 and f31 are inputted into a rectangular wave selection circuit 33 and either the rectangular wave signal f30 or f31 is outputted as a rectangular wave signal g30. The rectangular wave signals e and g30 are inputted into a moving direction determination circuit 34 serving as a signal processing portion and a moving direction signal i30 is obtained. The moving direction signal 130 together with the rectangular wave signal g30 is inputted into an output signal generation circuit 35 and processed therein. A sensor output signal j30 is thus outputted as an output.

Figure 9:
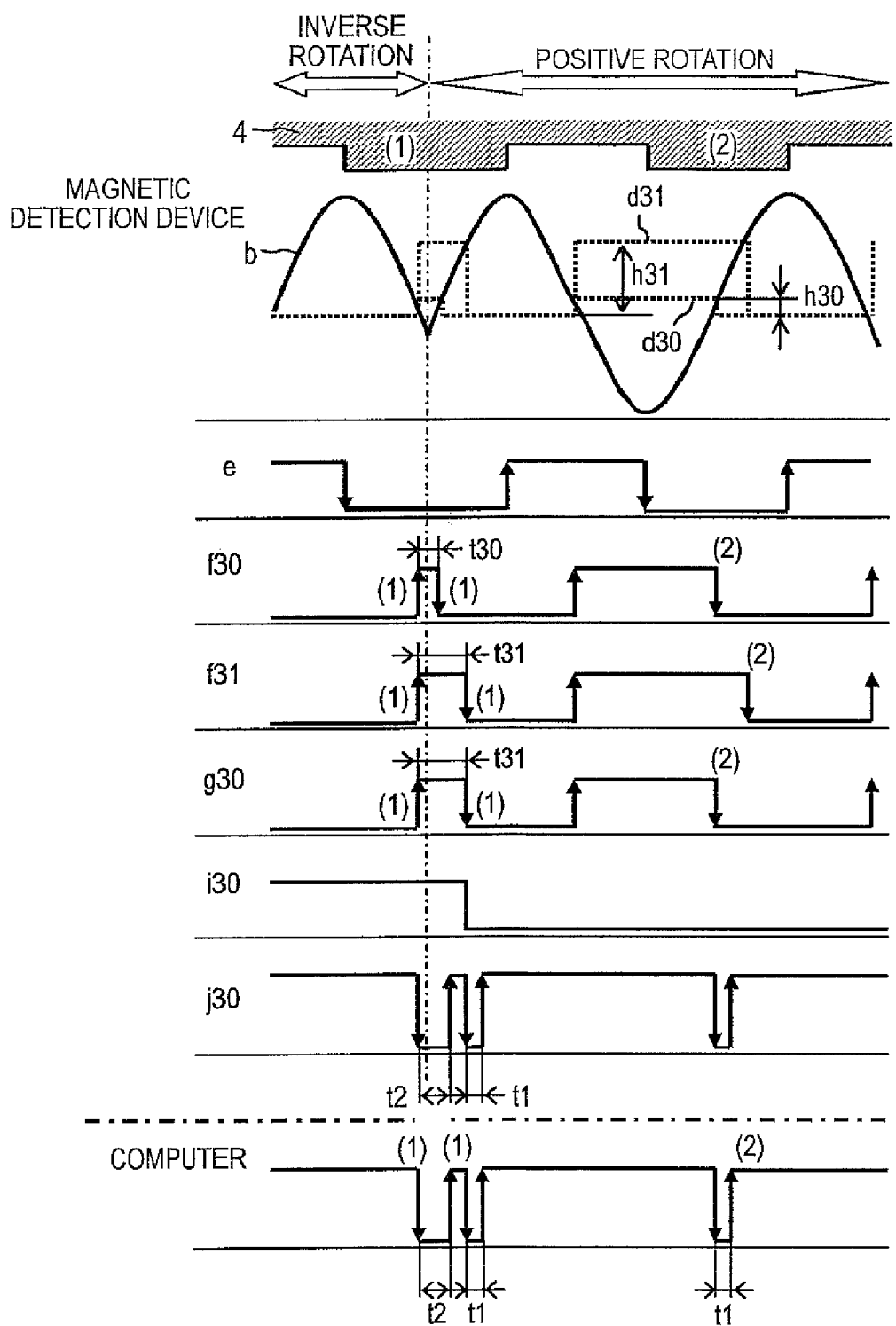
FIG. 9 is an operation waveform chart of the magnetic detection device according to the third embodiment of the invention.

FIG. 9 is an operation waveform chart of the third embodiment. Respective waveforms in the chart represent the bridge signal b of the magneto-electric conversion element 1b, the thresholds d30 and d31 of the comparing circuit 32 having the hystereses h30 and h31, respectively, the signals e, f30, f31, g30 and 130 of the respective portions in the signal processing circuit, and the sensor output signal j30 (the bridge signal a and the threshold c are omitted). The waveforms show an example where the moving direction of the magnetic mobile object 4 switches from the inverse direction to the forward direction. There is a phase difference between the rectangular wave signal e converted from the bridge signal a and the output g30 of the rectangular wave selection circuit 33 both inputted into the moving direction determination circuit 34. Because a combination thereof varies with the moving direction of the magnetic mobile object, it is possible to determine the moving direction of the magnetic mobile object. The moving direction signal i30 is in the low level and in the high level when the moving direction of the magnetic mobile object is the forward direction and the inverse direction, respectively. Time modulation is applied to the position signal of the sensor output signal j30 in sync with the rectangular wave signal g30 depending on the moving direction in such a manner that a time of the low level becomes a period t1 and a period t2 when the moving direction is the forward direction and the inverse direction, respectively.

The rectangular wave selection circuit 33 measures the delay times t30 and t31 caused by the hystereses of the rectangular wave signals f30 and f31 inputted therein. In a case where t30 satisfies an inequality below for the period t1 or t2 during which the sensor output signal j30 is in the low level:

$t30 > t2$ (where $t2 > t1$)

or $t30 > t1$ (where $t2 < t1$), the rectangular wave selection circuit 33 outputs the rectangular wave signal f30 as the output signal g30. In a case where t31 satisfies an inequality:

$t31 > t2 > t30$ (where $t2 > t1$)

or $t31 > t1 > t30$ (where $t2 < t1$), the rectangular wave selection circuit 33 outputs the rectangular wave signal f31 as the output signal g30.

FIG. 9 shows a case where the rectangular wave signal f31 is outputted as the output g30 of the rectangular wave selection circuit 33. Accordingly, the output signal g30 of the rectangular wave selection circuit 33 to be inputted into the output signal generation circuit 35 switches from the high level to the low level after the period t1 or the period t2 during which the sensor output signal j30 is in the low level. Hence, because the sensor output signal j30 can output a position signal in sync with the output signal g30 of the rectangular wave selection circuit 33, no detection delay occurs when the moving direction of the magnetic mobile object is detected. The computer unit thus becomes able to detect the position of the magnetic mobile object exactly even in a case where the switching of the moving direction of the magnetic mobile object takes place.

It should be appreciated that the number of the comparing circuits converting the bridge signal b to the rectangular wave signals is not limited to two in the signal processing circuit of the third embodiment and the signal processing circuit may be provided with three or more comparing circuits.

Fourth Embodiment

Figure 10:
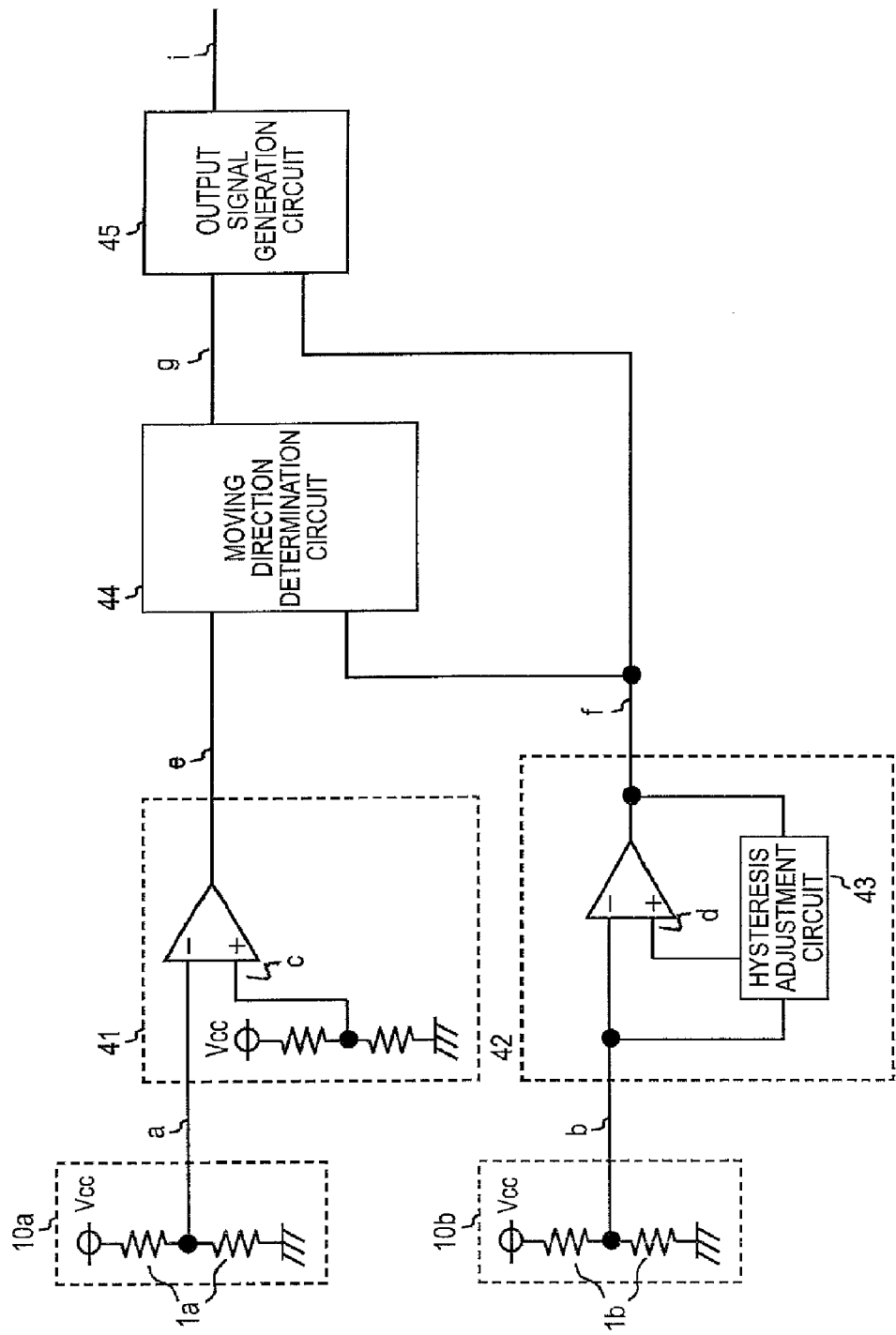
FIG. 10 is a view showing a signal processing circuit in a magnetic detection device according to a fourth embodiment of the invention.

FIG. 10 shows a signal processing circuit in a magnetic detection device according to a fourth embodiment of the invention. Referring to FIG. 10, magneto-electric transducer elements 1a and 1b form bridge circuits 10a and 10b, respectively, and when electric resistances of the magneto-electric transducer elements 1a and 1b vary in response to a movement of the magnetic mobile object 4, bridge signals a and b are obtained as voltage changes. The bridge signals a and b are compared with thresholds c and d in comparing circuits 41 and 42, respectively, and converted to rectangular wave signals e and f, respectively. The bridge signal b and the rectangular wave signal f are inputted into a hysteresis adjustment circuit 43 so that the hysteresis h of the threshold d is adjusted.

The rectangular wave signals e and f are inputted into a moving direction determination circuit 44 serving as a signal processing portion and a moving direction signal g is obtained. The moving direction signal g together with the rectangular wave signal f is inputted into an output signal generation circuit 45 and processed therein. A sensor output signal i is thus outputted as an output.

Figure 11:
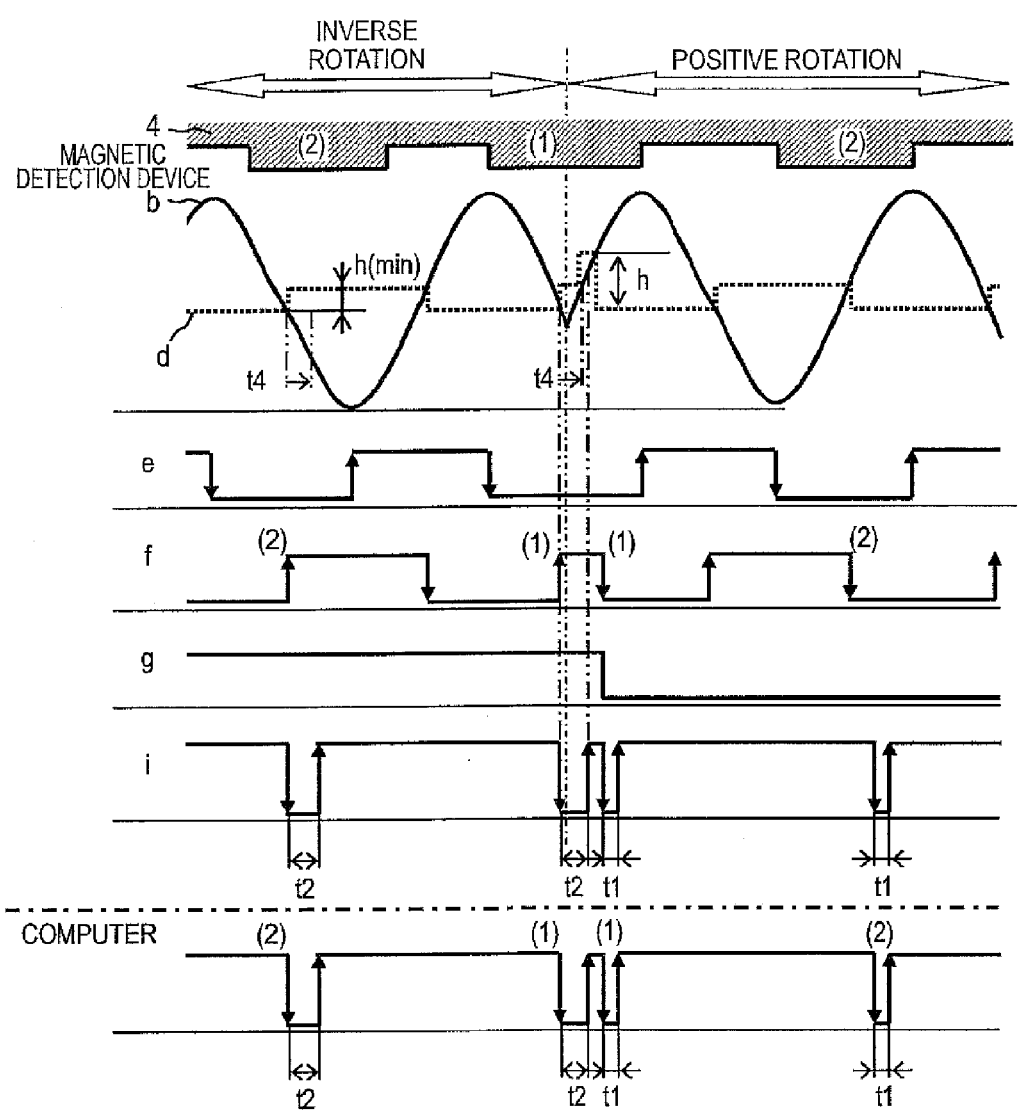
FIG. 11 is an operation waveform chart of the magnetic detection device according to the fourth embodiment of the invention.

FIG. 11 is an operation waveform chart of the fourth embodiment. Respective waveforms in the chart represent the bridge signal b of the magneto-electric conversion element 1b, the threshold d of the comparing circuit 42 having the hysteresis h, the signals e, f, g, and i of the respective portions in the signal processing circuit (the bridge signal a and the threshold c are omitted). The waveforms show an example where the moving direction of the magnetic mobile object switches from the inverse direction to the forward direction.

There is a phase difference between the rectangular wave signal e converted from the bridge signal a and the rectangular wave signal f as an output of the comparing circuit 42 both inputted into the moving direction determination circuit 44. Because a combination thereof varies with the moving direction of the magnetic mobile object, it is possible to determine the moving direction of the magnetic mobile object. The moving direction signal g is in the low level and in the high level when the moving direction of the magnetic mobile object is the forward direction and the inverse direction, respectively. Time modulation is applied to the sensor output signal i in sync with the rectangular wave signal f depending on the moving direction in such a manner that a time of the low level becomes a period t1 and a period t2 when the moving direction is the forward direction and the inverse direction, respectively.

When the bridge signal b varies and crosses the threshold d, the threshold d varies only by the hysteresis h(min) and the rectangular wave signal f switches from the low level to the high level. The hysteresis adjustment circuit 43 measures potential b(t4) of the bridge signal b after an elapse of a time t4 (t4<t1, t2) since the timing at which the rectangular wave signal f switched from the low level to the high level and compares the potential b(t4) with the threshold d. In a case where an inequality:

$$b(t4)<d$$

is satisfied, the hysteresis adjustment circuit 43 fixes the hysteresis h of the threshold d to h(min). Meanwhile, in a case where an inequality:

$$b(t4) \geq d$$

is satisfied, the hysteresis adjustment circuit 43 measures potential b(t2) of the bridge signal b after an elapse of the period t2 during which the sensor output signal i is in the low level since the timing at which the rectangular wave signal f switched from the low level to the high level and changes the hysteresis so that the hysteresis h of the threshold d satisfies an inequality:

$$h>b(t2)-d.$$

Accordingly, no detection delay occurs when the moving direction of the magnetic mobile object is detected and the sensor output signal i can output the position signal in sync with the rectangular wave signal f. The computer unit thus becomes able to detect the position of the magnetic mobile object exactly even in a case where the switching of the moving direction of the magnetic mobile object takes place.

The above has described a case where the moving direction of the magnetic mobile object 4 switches from the inverse direction to the forward direction. However, in a case where the moving direction of the magnetic mobile object 4 switches from the forward direction to the inverse direction, by changing hysteresis in such a manner that the hysteresis h of the threshold d satisfies an inequality:

$$h>b(t1)-d$$

when b(t4) takes a value such that satisfies b(t4)≧d, the sensor output signal i can output the position signal in sync with the rectangular wave signal f without causing a detection delay when the moving direction of the magnetic mobile object is detected.

It should be appreciated that the phase relation of the rectangular wave signal f and the sensor output signal i in the fourth embodiment is not limited to the phase relation specified above. When the moving direction of the magnetic mobile object is the forward direction, the timing at which an output of the sensor output signal i switches from the high level to the low level may be the timing at which the rectangular wave signal f switches from the high level to the low level. In this case, the hysteresis adjustment circuit 43 measures the potential b(t4) of the bridge signal b after an elapse of the time t4 (t4<t1, t2) since the rectangular wave signal f switched from the high level to the low level and compares the potential b(t4) with the threshold d. In a case where an inequality:

$$b(t4)>d$$

is satisfied, the hysteresis adjustment circuit 43 fixes the hysteresis h of the threshold d to h(min). Meanwhile, in a case where an inequality:

$$b(t4) \leq d$$

is satisfied, the hysteresis adjustment circuit 43 measures the potential b(t2) of the bridge signal b after an elapse of the period t2 during which the sensor output signal i is in the low level since the timing at which the rectangular wave signal f switched from the high level to the low level. The hysteresis adjustment circuit 43 then changes hysteresis so that the hysteresis h of the threshold d satisfies an inequality:

$$h>d-b(t2).$$

Fifth Embodiment

In a case where the magnetic detection device described above is used to detect, for example, the piston position of the engine of an automobile, signals from the magneto-electric transducer elements may possibly vary because of the layout and the use environment (in particular, use under high temperature) of the magnetic mobile object and the magneto-electric transducer elements.

A magnetic detection device of a fifth embodiment is configured to address a variance of output signals from the magneto-electric transducer elements caused by the use environment.

Figure 12:
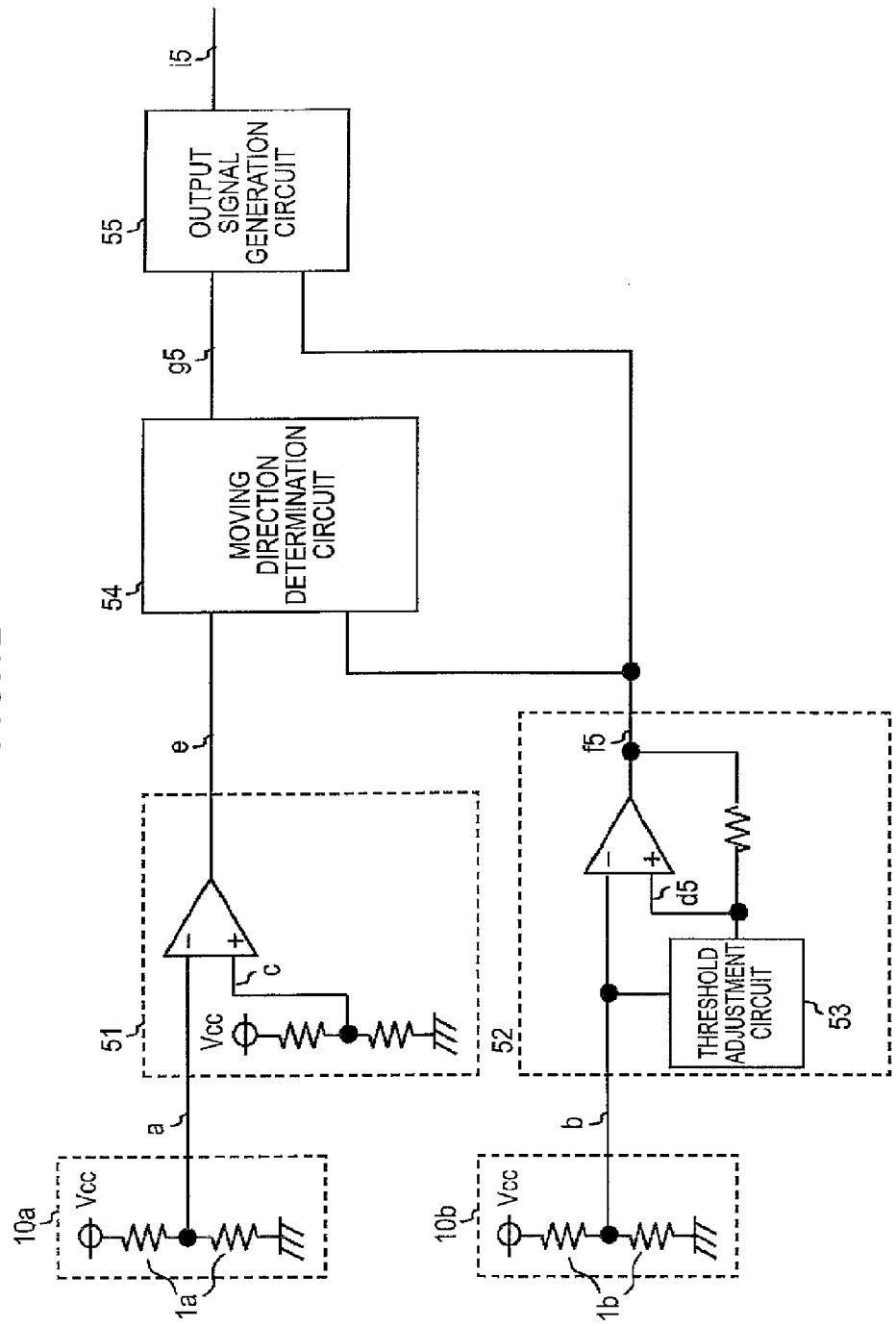
FIG. 12 is a view showing a signal processing circuit in a magnetic detection device according to a fifth embodiment of the invention.

FIG. 12 is a signal processing circuit in the magnetic detection device of the fifth embodiment.

Referring to FIG. 12, magneto-electric transducer elements 1a and 1b form bridge circuits 10a and 10b, respectively, and when electric resistances of the magneto-electric transducer elements 1a and 1b vary with a movement of the magnetic mobile object 4, bridge signals a and b are obtained as voltage changes. The bridge signals a and b are compared with thresholds c and d5 in comparing circuits 51 and 52, respectively, and converted to rectangular wave signals e and f5, respectively.

The bridge signal b is inputted into a threshold adjustment circuit 53 and the threshold d5 of the comparing circuit 52 is adjusted. The rectangular wave signals e and f5 are inputted into a moving direction determination circuit 54 serving as a signal processing portion and a moving direction signal g5 is obtained. The moving direction signal g5 together with the rectangular wave signal f5 is inputted into an output circuit 55 and processed therein. A sensor output signal i5 is thus outputted as an output.

Figure 13:
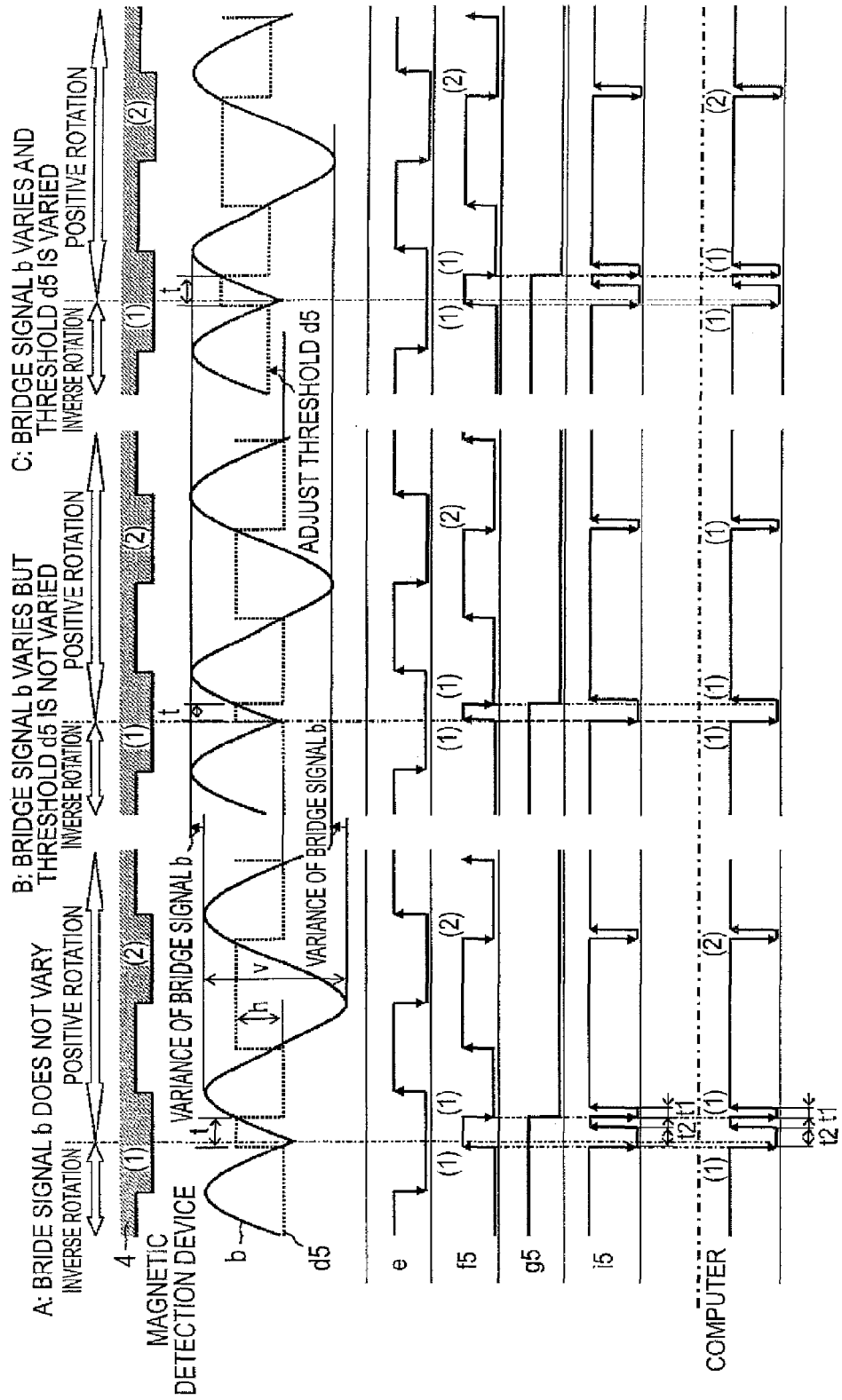
FIG. 13A through FIG. 13O are operation waveform charts of the magnetic detection device according to the fifth embodiment of the invention.

FIG. 13A through 13C are operation waveform charts of the fifth embodiment. Respective waveforms in the charts represent the bridge signal b of the magneto-electric conversion element 1b, the threshold d5 having hysteresis h, and signals e, f5, g5, and 15 of the respective portions in the signal processing circuit (the bridge signal a and the threshold c are omitted).

The threshold d5 has constant hysteresis h and sets a voltage of ½V for the amplitude V of the bridge signal b. There is a phase difference between the rectangular wave signal e converted from the bridge signal a and the rectangular wave signal f5 of the comparing circuit 52 both inputted into the moving direction determination circuit 54. Because a combination thereof varies with the moving direction of the magnetic mobile object, it is possible to determine the moving direction of the magnetic mobile object. The moving direction signal g5 is in the low level and the high level when the moving direction of the magnetic mobile object is in the forward direction and the inverse direction, respectively. Time modulation is applied to the sensor output signal i5 in sync with the rectangular wave signal f5 depending on the moving direction in such a manner that a time of the low level becomes a period, t1=45 μsec, and a period, t2=90 μsec, when the moving direction is the forward direction and the inverse direction, respectively.

FIG. 13A shows a case where the bridge signal b does not vary at all.

In this case, hysteresis is set so that a delay time t caused by the hysteresis h satisfies t>t2 for the period t2 during which the sensor output signal i5 is in the low level. Accordingly, because the sensor output signal 15 can output the position signal in sync with the rectangular wave signal f5, no detection delay occurs when the moving direction of the magnetic mobile object is detected.

FIG. 13B shows a case where the bridge signal b varies but the threshold d5 is not varied.

In this case, a time delay t caused by the hysteresis h becomes shorter than the period t2 during which the sensor output signal i5 is in the low level and the sensor output signal cannot output the position signal in sync with the rectangular wave signal f5. Accordingly, a detection delay occurs when the moving direction of the magnetic mobile object is detected.

FIG. 13C shows a case where the bridge signal b varies and the threshold d5 is varied in response to a variance of the bridge signal b.

In this case, when the bridge signal b varies, the threshold adjustment circuit 53 varies the threshold d5 to a voltage of ½V for the amplitude V of the bridge signal b. Accordingly, as with the case where the bridge signal b does not vary at all described above, even when the bridge signal b varies, owing to the threshold d5, the time delay t caused by hysteresis becomes longer than the period t2 during which the sensor output signal i5 is in the low level and the sensor output signal i5 can output the position signal in sync with the rectangular wave signal f5. Consequently, no detection delay occurs when the moving direction of the magnetic mobile object is detected. The computer unit thus becomes able to detect the position of the magnetic mobile object exactly even in a case where switching of the moving direction of the magnetic mobile object takes place.

Figure 14:
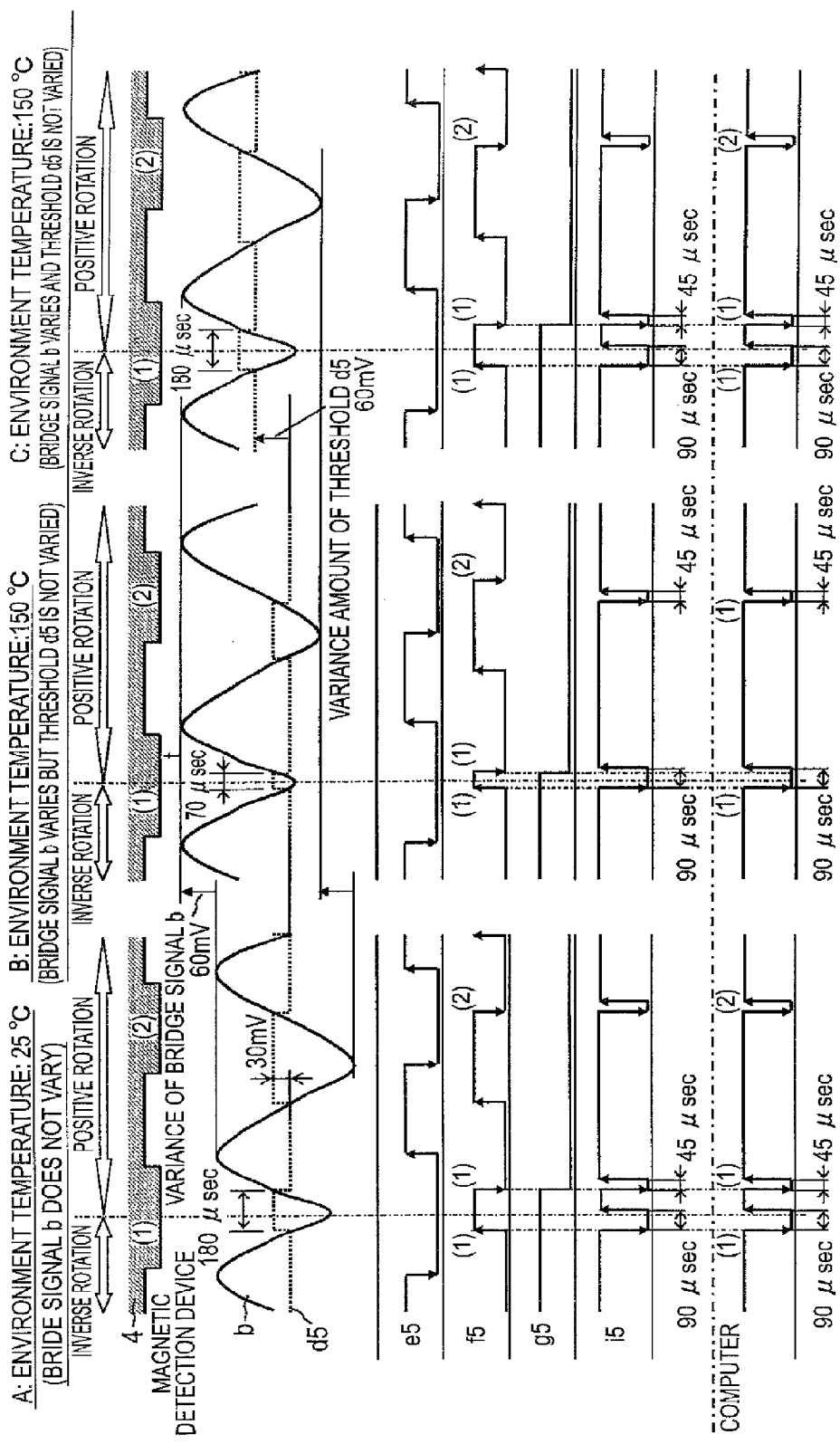
FIG. 14A through FIG. 14C are charts showing concrete examples of the operation waveforms of the magnetic detection device according to the fifth embodiment of the invention.
Figure 15:
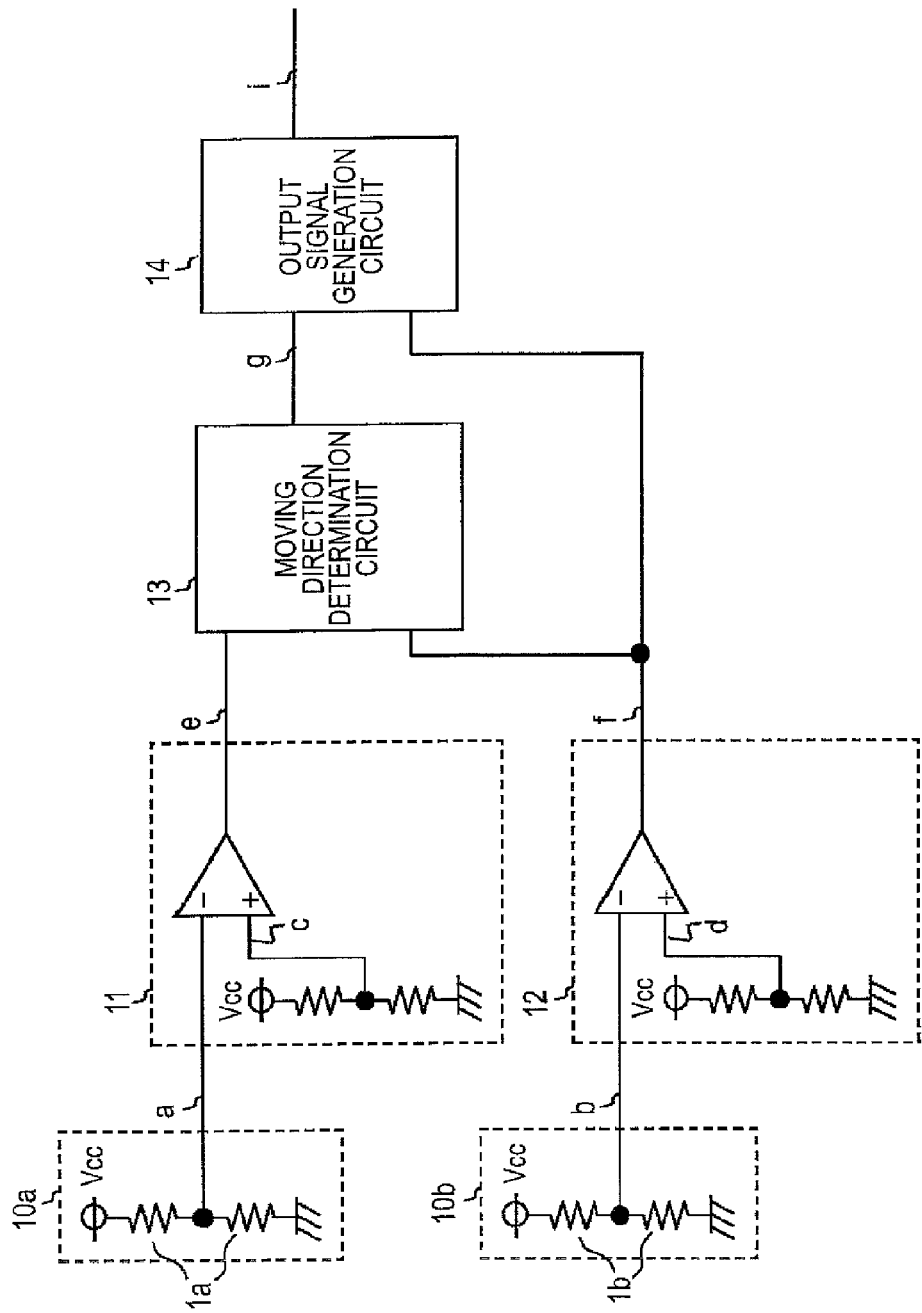
FIG. 15 is a view showing a signal processing circuit of a magnetic detection device in the related art.
Figure 16:
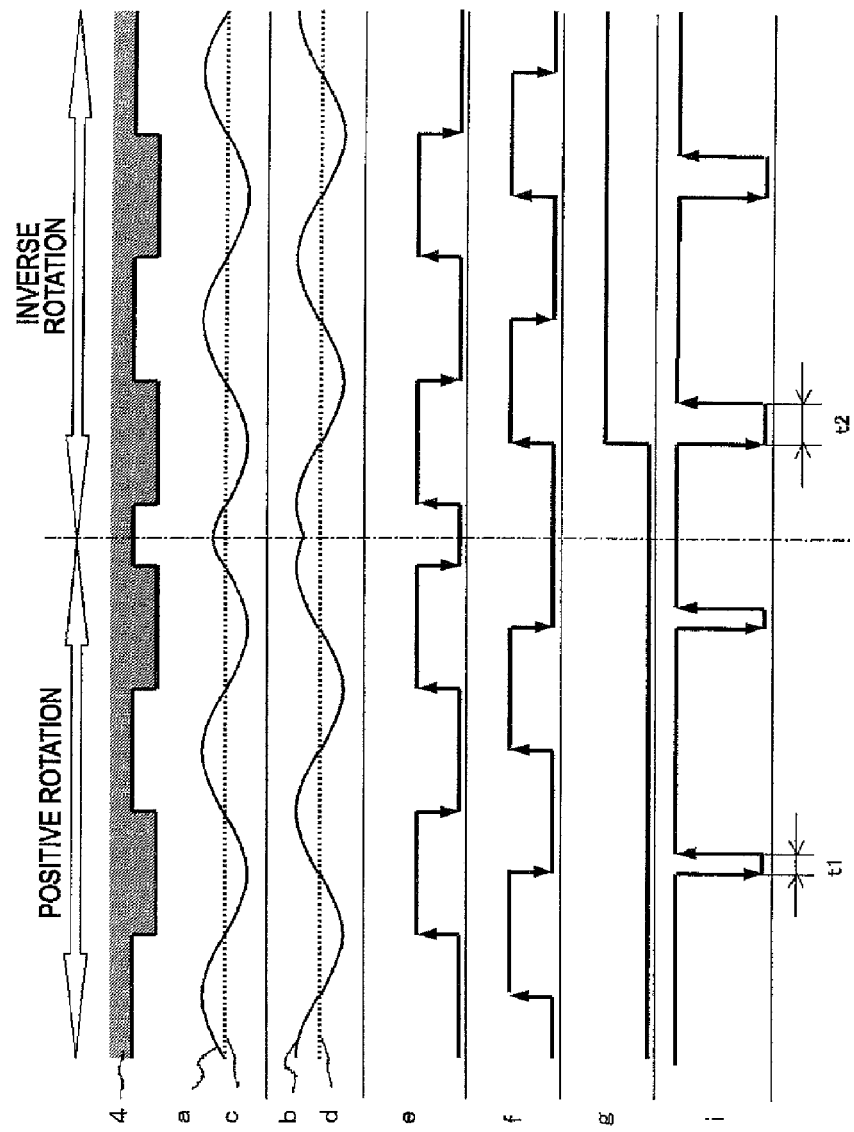
FIG. 16 is an operation waveform chart of the magnetic detection device in the related art.
Figure 17:
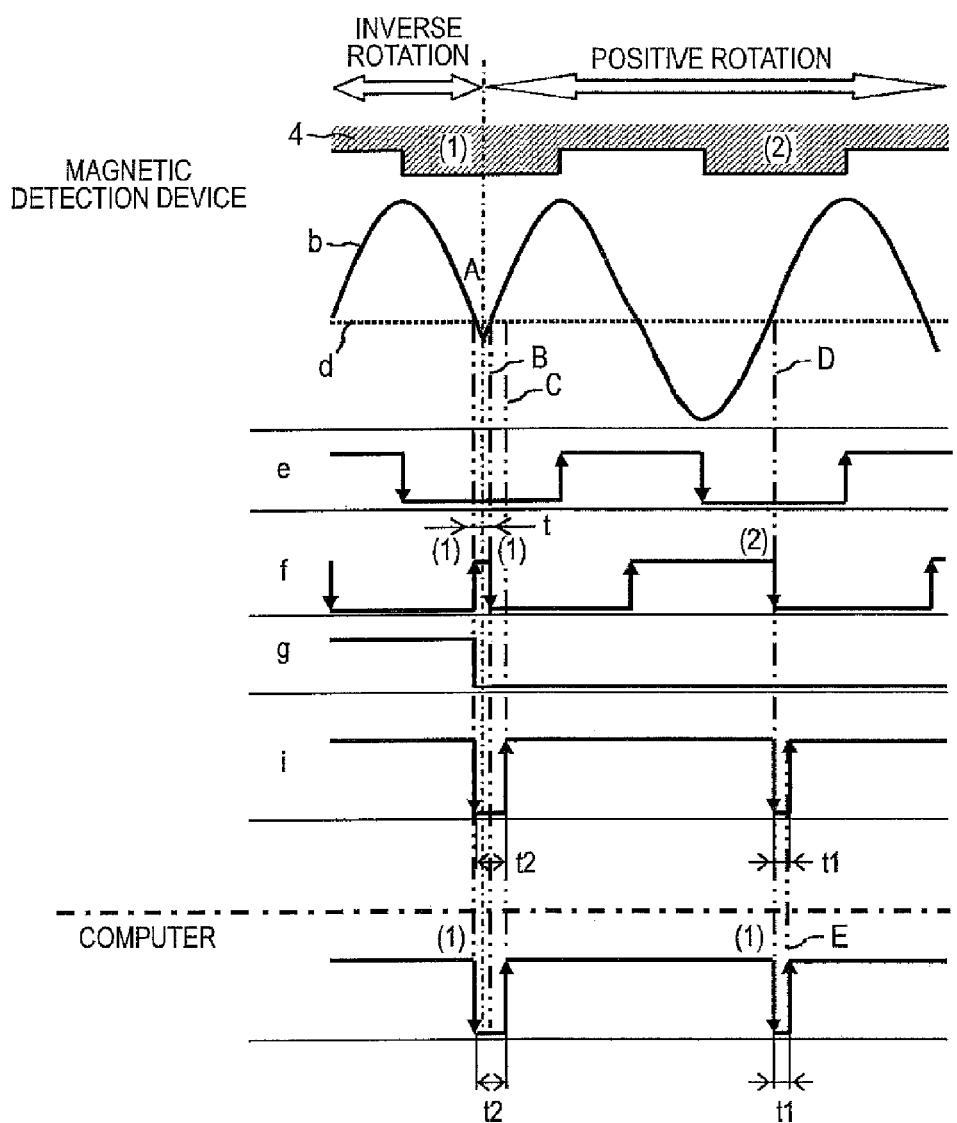
FIG. 17 is an operation waveform chart of the magnetic detection device in the related art.
Figure 18A:
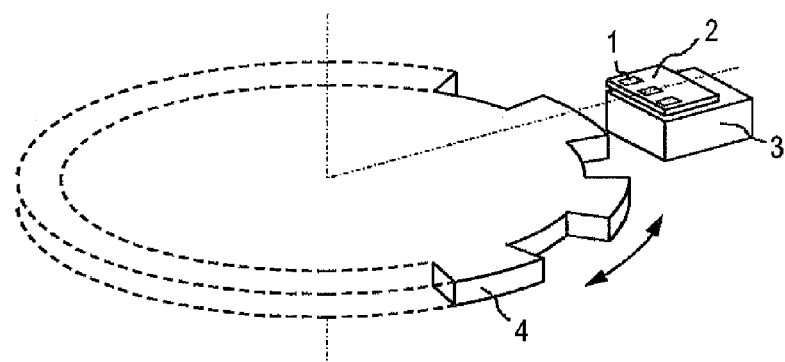
FIG. 18A and FIG. 18B are views showing the configuration of a magnetic circuit in the magnetic detection device in the related art.
Figure 18B:
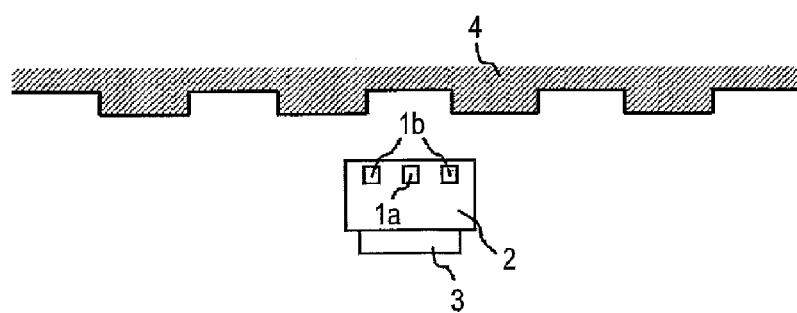

FIG. 14A through FIG. 14C show concrete examples of the fifth embodiment in a case where a plate made of iron having a diameter 150 mm, a thickness of 2.6 mm and 60 protrusions each having a protrusion width of 2.5 mm is used as the magnetic mobile object. The charts show the bridge signal b, the threshold d5 having the hysteresis h, and the signals e, f5, g5, and 15 of the respective portions in the signal processing circuit (the bridge signal a and the threshold c are omitted) of the magnetic detection sensor at temperatures of 25° C. and 150° C.

The hysteresis h of the threshold d5 is set to 30 mV for the period t2 during which the sensor output signal i5 is in the low level at the environment temperature of 25° C. (in a case where the bridge signal b does not vary at all), so that the time delay t caused by the hysteresis h satisfies t>t2.

FIG. 14A shows a case where the bridge signal b does not vary at all.

In this case, the delay time caused by the hysteresis h is 180 μsec for 90 μsec, which is the period during which the sensor output signal i5 is in the low level. Hence, because the sensor output signal i5 can output the position signal in sync with the rectangular wave signal f5, no detection delay occurs when the moving direction of the magnetic mobile object is detected.

FIG. 14B shows a case where the bridge signal b varies but the threshold d5 is not varied.

In this case, the bridge signal b varies to 60 mV because of a change in environment temperature from 25° C. to 150° C. In a case where the threshold d5 is not varied in response to a variance of the bridge signal b, a time delay t caused by the hysteresis h is 70 μsec and becomes shorter than 90 μsec, which is the period during which the sensor output signal i5 is in the low level. Accordingly, because the sensor output signal cannot output the position signal in sync with the rectangular wave signal f5, a detection delay occurs when the moving direction of the magnetic mobile object is detected.

FIG. 14C shows a case where the bridge signal b varies and the threshold d5 is varied in response to the variance of the bridge signal b.

In this case, the threshold adjustment circuit 53 varies the threshold d5 to 60 mV in response to 60 mV, which is an amount of variance of the bridge signal b. Accordingly, as in the case where the bridge signal b does not vary at all described above, even when the bridge signal b varies, owing to the threshold d5, the time delay caused by the hysteresis h is 180 μsec and becomes longer than 90 μsec, which is the period during which the sensor output signal i5 is in the low level. The sensor output signal i5 can therefore output the position signal in sync with the rectangular wave signal f5.

As has been described, according to the magnetic detection device of the fifth embodiment of the invention, in a case where the magnetic detection device is used under severe use environment, in particular, under severe temperature environment, as in the engine of an automobile, by varying the threshold in response to a variance of the output signal of the magneto-electric conversion element when an output signal of the magneto-electric conversion element varies (or by varying the width of the hysteresis of the threshold), it becomes possible to detect the moving direction of the magnetic mobile object exactly without any delay.

It should be appreciated that the circuit configuration of the magneto-electric conversion element in the respective embodiments above is not limited to a monolithic configuration. For example, a Wheatstone bridge circuit may be formed so that differentially amplified midpoint potential of the bridge is used.

In addition, selections of the components forming the magnetic detection device and the configuration thereof are not particularly limited. For example, the magneto-electric conversion element can be any element detecting field intensity, such as a hall element, a magneto-resistance (MR) element, a giant magneto-resistance (GMR) element, and a tunnel magneto-resistance (TMR) element. Also, the number of elements and the layout thereof can be selected arbitrarily within the extent that the moving position and the moving direction of the magnetic mobile object are detectable (for example, two magnetic detection sensors may be employed). Further, the signal processing circuit may be a bi-polar MOS (Metal-Oxide Semiconductor).

Moreover, the duration of the signal indicating the moving direction of the magnetic mobile object is not limited to the duration during which the sensor output signal is in the low level and it may be the duration in which the signal indicating the moving direction of the magnetic mobile object is in the high level.

In addition, in a case where the magnetic detection device of the invention is used as an on-vehicle rotation detection device, information of the rotation position is used, for example, for ignition control by providing the position of the piston of the engine. By detecting the rotation direction, the position of the piston can be detected exactly not only during normal rotation of the engine but also at a stop operation. Accordingly, ignition control can be performed during all the operations.

Various modifications and alterations of this invention will be apparent to those skilled in the art without departing from the scope and spirit of this invention, and it should be understood that this is not limited to the illustrative embodiments set forth herein.

What is claimed is:

1. A magnetic detection device, comprising:
a signal processing circuit having,
magneto-electric transducer elements that detect field intensity,
comparing circuits that have thresholds and output rectangular wave signals by comparing the thresholds with output signals of the magneto-electric transducer elements, and
signal processing portions that output a sensor output signal by detecting a moving position and a moving direction of a magnetic mobile object that gives a change to a magnetic field to be applied to the magneto-electric transducer elements using the output signals of the comparing circuits, wherein:
an output of the signal processing circuit is a position signal undergoing one of switching from a high level to a low level and switching from the low level to the high level and the switching corresponds to a position of the magnetic mobile object;
a duration during which the position signal is in one of the high level and the low level corresponds to the moving direction of the magnetic mobile object;
the duration during which the position signal is in one of the high level and the low level is fixed to one of a period t1 and a period t2 depending on the moving direction of the magnetic mobile object; and
in a case where the switching of the moving direction of the magnetic mobile object takes place within a time of one of the period t1 and the period t2, the signal processing circuit outputs a position signal same as a position signal indicating the position of the magnetic mobile object immediately before the switching of the moving direction of the magnetic mobile object due to hysteresis of the threshold of the comparing circuit, so that no displacement occurs between the position of the magnetic mobile object and the position signal of the signal processing circuit caused by the switching, of the moving direction of the magnetic mobile object.

2. The magnetic detection device according to claim 1, wherein:
the signal processing circuit is configured in such a manner that the thresholds of the comparing circuit have hysteresis of two or more levels.

3. The magnetic detection device according to claim 1, wherein:
when the switching of the moving direction of the magnetic mobile object takes place within the time of one of the period t1 and the period t2, in a case where a variance of the output signal of the magneto-electric transducer element within the time of one of the period t1 and the period t2 is approximated to one of a×t1 and a×t2, where a is a constant, the signal processing circuit sets hysteresis h of the threshold so as to satisfy one of inequalities:

$$h^2 > t1^2 \times (a^2 - 1),$$

and $$h^2 > t2^2 \times (a^2 - 1).$$

4. The magnetic detection device according to claim 1, wherein:
the signal processing circuit further has a hysteresis adjustment circuit that switches hysteresis of the threshold of the comparing circuit in response to the output signal of the magneto-electric transducer element when the switching of the moving direction of the magnetic mobile object takes place within the time of one of the period t1 and the period t2.

5. The magnetic detection device according to claim 1, wherein:
the signal processing circuit further has a threshold adjustment circuit that varies the threshold of the comparing circuit in response to a variance of the output signal of the magneto-electric transducer element.

6. The magnetic detection device according to claim 1, wherein:
the signal processing circuit is used as an on-vehicle rotation detection device.

7. The magnetic detection device according to claim 1, wherein:
the magneto-electric transducer elements are magneto-resistance elements.

8. The magnetic detection device according to claim 7, wherein:
the magneto-electric transducer elements use giant magneto-resistance elements.

* * * * *